June 9, 1925.

W. A. KNOOP

ELECTRIC RESISTANCE WELDING

Filed March 4, 1920

1,541,513

Inventor
William A. Knoop
by G. M. Campbell
Atty.

Patented June 9, 1925.

1,541,513

UNITED STATES PATENT OFFICE.

WILLIAM A. KNOOP, OF EAST NEWPORT, NEW YORK, ASSIGNOR TO WESTERN ELECTRIC COMPANY, INCORPORATED, OF NEW YORK, N. Y., A CORPORATION OF NEW YORK.

ELECTRIC RESISTANCE WELDING.

Application filed March 4, 1920. Serial No. 363,121.

*To all whom it may concern:*

Be it known that I, WILLIAM AUGUST KNOOP, a citizen of the United States, residing at East Newport, in the county of Suffolk and State of New York, have invented certain new and useful Improvements in Electric Resistance Welding, of which the following is a full, clear, concise, and exact description.

This invention relates to electric resistance welding, and more particularly to a method of welding together two pieces of metal of different cross-sectional areas, such, for example, as a wire and a comparatively thin plate.

By means of this invention the abutting or contacting surfaces of two metal members having different cross-sectional areas and different thermic and electric resistances may be brought simultaneously to the desired degree of plasticity to produce an intimate and rigid connection of the two members.

The improved method of this invention consists in so regulating the flow of current through the parts to be welded that the maximum heat will be generated at a point of contact between the two members. This may be brought about by so proportioning and shaping the electrodes that the two parts—that part having the greater thermic conductivity and the lower electrical resistance, and that part having the lower thermic conductivity and the greater electrical resistance—will have the welding heat concentrated at or near the contacting surfaces. In the preferred form of this invention this is accomplished by grooving or cutting away the electrodes in engagement with the plate to provide a groove parallel to the wire and by using either a grooved or an ordinary flat faced electrode in contact with the wire. Under these conditions the path for the current flow will cause a substantially uniform distribution of the generated heat throughout the parts to be welded, with the exception possibly that at the point of contact between the members the temperature will be highest.

Figure 1:
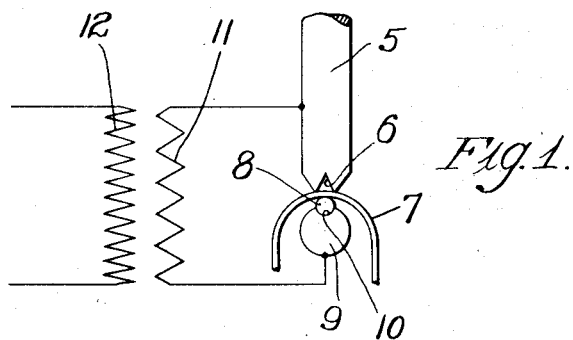
Figure 2:
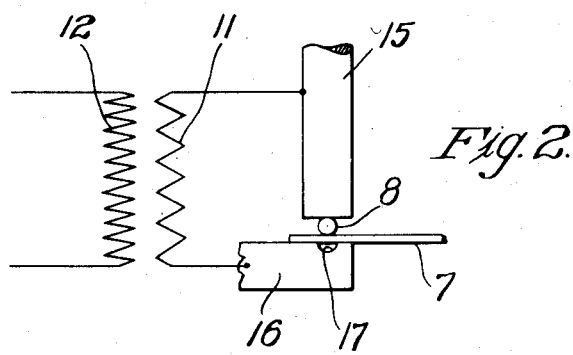

In the drawings illustrating this invention, Figures 1 and 2 illustrate different forms of suitable apparatus for welding a sheet and wire together in accordance with the method of this invention. Both figures are views looking at the end of the wire and the edge of the plate.

In Fig. 1 there is shown an upper electrode 5 provided with a groove or cut-away portion 6 the edges of which bear upon a plate 7 over a wire 8, the sides of which wire are parallel to the edges of the groove or cut-away portion 6 of the upper electrode 5. In this figure a lower electrode 9 has a groove 10 therein in which the wire 8 rests. A transformer secondary 11 has its terminals connected with electrodes 5 and 9 and is in inductive relation to a primary 12 connected with any suitable source of power (not shown).

In Fig. 2 an upper electrode 15 having a flat face bears upon the wire 8 which rests upon the plate 7. The plate 7 rests upon a flat electrode 16 which has a groove 17 therein directly under the wire 8 which is parallel to the wire.

When current is applied to the electrodes in the above illustration the electric energy is converted into heat, the heat developed in watts being equal to the product of the square of the current and the sum of the resistances in the path, which in the case of Fig. 1 will be the resistance of the contact between the upper electrode 5 and the plate 7 plus the resistance of the plate 7 between the contacting surfaces of electrode 5 and the wire 8, plus the resistance of the contact between the plate 7 and the wire 8, plus the resistance of the wire between the electrode 9 and the plate 7, plus the resistance of the contact between the wire 8 and the electrode 9. As the resistance of a path is proportional to its length and inversely proportional to its cross-sectional area and the wire 8 is thick in comparison with the plate 7, it follows that this wire will heat more quickly than the plate, unless some means are provided for equalizing the current flow through the two members and for limiting the conduction of heat from the plate through the electrode in contact therewith. If the resistance between the weld and the electrode in contact with the plate is increased, the parts may be made to produce the maximum of heat at or near the line or point of contact of the wire and the plate.

In this invention these results are accomplished in the apparatus shown and described; and while that form illustrated in Fig. 1 is the preferred form, it has been found in practice that the conditions illustrated in Fig. 2 will produce a satisfactory weld of the wire and plate.

What is claimed is:

1. The method of electrically welding an element to a second element of lower resistance, which consists in pressing an electrode against the first mentioned element, pressing a second electrode against said second element in such manner that it contacts with a plurality of spaced surfaces on said second element, and passing a welding current through said electrodes.

2. A method of electrically welding an element to a second element of lower resistance, which consists in pressing an electrode of comparatively large area against the first mentioned element in such manner that it contacts with a comparatively large portion of the surface of said first mentioned element, pressing a grooved electrode against said second element, and passing a welding current between the electrodes.

3. The method of electrically welding an element to a second element of lower resistance, which consists in bringing the elements into such positions that they contact with each other along a single line, pressing an electrode against the first mentioned element, pressing a second electrode against said second element in such manner that it contacts with a plurality of spaced surfaces on said second element, and passing a welding current between said electrodes.

4. The method of electrically welding a wire and a plate which comprises placing the wire between an electrode and one surface of the plate, placing a grooved electrode against the opposite surface of the plate and passing a welding current between the electrodes.

5. The method of electrically welding a wire and a plate which comprises placing the wire between an electrode and the plate, placing another electrode in contact with a plurality of surfaces on the plate each of which surfaces is offset from the line of contact between the plate and the wire, and passing a welding current between the electrodes.

6. The method of electrically welding a wire and a plate which comprises placing the wire against the plate and passing a welding current between a point on the wire and a plurality of spaced points on the plate sufficiently separated from the line of contact between the wire and the plate to equalize the electrical resistances of the paths between the line of contact and the points thereby insuring the generation of maximum heat at or near the line of contact.

7. The method of electrically welding a wire and a plate which comprises placing the wire against the plate and placing electrodes in contact with the wire and the plate at points so removed from the line of contact between the wire and the plate as to equalize the electrical resistances of the paths extending to the electrodes from the line of contact and passing a welding current between the electrodes to generate maximum heat at the line of contact.

8. The method of electrically welding a wire and a plate which comprises placing the wire against the plate and passing a welding current between an electrode in contact with the wire and an electrode in contact with the plate at a point offset along the plate from the line of contact between the wire and the plate.

9. The method of electrically welding a wire and a plate which comprises placing the wire against the plate and passing a welding current between an electrode in contact with the wire and another electrode having a contact area completely offset along the plate from the line of contact between the wire and the plate.

10. The method of electrically welding a wire and a plate which comprises placing the wire against the plate and passing a welding current between an electrode in contact with the wire and another electrode having a plurality of separated areas in contact with the plate, each area offset along the plate from the line of contact between the wire and the plate.

In witness whereof, I hereunto subscribe my name this 1st day of March A. D., 1920.

WILLIAM A. KNOOP.